United States Patent
Watson, II et al.

(10) Patent No.: US 10,464,393 B2
(45) Date of Patent: Nov. 5, 2019

(54) SYSTEM AND METHOD FOR MANAGING OPERATIONAL STATES OF A VARIABLE DISPLACEMENT COMPRESSOR BASED UPON CLIMATE CONDITIONS

(71) Applicant: GM Global Technology Operations LLC, Detroit, MI (US)

(72) Inventors: George S. Watson, II, Southfield, MI (US); Rupesh S. Kakade, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 15/631,438

(22) Filed: Jun. 23, 2017

(65) Prior Publication Data

US 2018/0370327 A1 Dec. 27, 2018

(51) Int. Cl.
*B60H 1/00* (2006.01)
*B60H 1/32* (2006.01)

(52) U.S. Cl.
CPC ....... *B60H 1/00735* (2013.01); *B60H 1/3208* (2013.01); *B60H 1/3216* (2013.01); *B60H 1/3223* (2013.01); *B60H 1/00792* (2013.01); *B60H 1/00807* (2013.01); *B60H 1/00814* (2013.01); *B60H 2001/3245* (2013.01); *B60H 2001/3258* (2013.01); *B60H 2001/3261* (2013.01); *B60H 2001/3275* (2013.01)

(58) Field of Classification Search
None
See application file for complete search history.

(56) References Cited

U.S. PATENT DOCUMENTS

| | | | |
|---|---|---|---|
| 2003/0051495 A1* | 3/2003 | Ohta | B60H 1/322 62/229 |
| 2012/0160470 A1* | 6/2012 | Misumi | B60H 1/3207 165/287 |

* cited by examiner

*Primary Examiner* — Jonathan M Dager
*Assistant Examiner* — Garrett F Evans

(57) ABSTRACT

A system is disclosed. The system includes a climate condition determination module that is configured to determine a climate condition associated with a vehicle based upon an external air temperature or a dew point temperature. The system also includes a compressor operational state control module that is configured to control a plurality of operational states of a variable displacement compressor of a heating, ventilation and air conditioning system within the vehicle. The compressor operational state control module is configured to cause the variable displacement compressor to selectively transition from a variable displacement operational state to a fixed displacement-like operational state when the climate condition exceeds a climate threshold to cause an evaporator of the heating, ventilation and air conditioning system to provide evaporator air having an air temperature corresponding to a target evaporator air temperature.

16 Claims, 5 Drawing Sheets

SYSTEM AND METHOD FOR MANAGING OPERATIONAL STATES OF A VARIABLE DISPLACEMENT COMPRESSOR BASED UPON CLIMATE CONDITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to heating, ventilation and air conditioning (HVAC) systems that selectively transitions a variable displacement compressor between various operational states, and more specifically to a system and a method for selectively transitioning the variable displacement compressor between a variable displacement operational state and a fixed displacement operational state.

Automotive vehicles typically include an HVAC system to control environmental conditions within a cabin of the vehicle. The HVAC system controls the environmental conditions within the cabin by distributing air through various ducts deployed throughout the vehicle and duct work may be undesirable for these types of vehicles.

SUMMARY

In an example, a system is disclosed. The system includes a climate condition determination module that is configured to determine a climate condition associated with a vehicle based upon an external air temperature or a dew point temperature. The system also includes a compressor operational state control module that is configured to control a plurality of operational states of a variable displacement compressor of a heating, ventilation and air conditioning system within the vehicle. The compressor operational state control module is configured to cause the variable displacement compressor to selectively transition from a variable displacement operational state to a fixed displacement-like operational state when the climate condition exceeds a climate threshold to cause an evaporator of the heating, ventilation and air conditioning system to provide evaporator air having an air temperature corresponding to a target evaporator air temperature.

In other features, the climate condition is based upon the external air temperature and the dew point temperature. In other features, the climate condition exceeds the climate threshold when the external air temperature is greater than or equal to an external temperature threshold and the dew point temperature does not exceed a dew point threshold.

In other features, the system includes a timer module that is configured to increment a time counter when the climate condition exceeds a climate threshold, and the compressor operational state control module is further configured to selectively transition between a minimum and a maximum evaporator air target temperatures to produce a fixed displacement-like operation with the variable displacement compressor.

In other features, the compressor operational state control module is further configured to maintain a cyclic mode of operation flag based upon the climate condition. In other features, the cyclic mode of operation flag is set to Boolean true when the climate condition exceeds the climate threshold and is set to Boolean false when the climate condition does not exceed the climate threshold.

In other features, the compressor operational state control module is further configured to cause the variable displacement compressor to operate in the fixed displacement-like operational state when the cyclic mode of operation flag is set to Boolean true and the time counter does not exceed a predefined time period. In other features, the compressor operational state control module is further configured to cause the variable displacement compressor to transition from the fixed displacement-like operational state to the variable displacement operational state when the cyclic mode of operation flag is set to Boolean true and the time counter exceeds a predefined time period.

In other features, the system includes a dew point determination module that is configured to determine the dew point temperature based upon a cabin air humidity characteristic, an external air humidity characteristic, or an air inlet mixing radio. In other features, the system includes an external temperature determination module that is configured to determine the external air temperature.

In an example, a method includes determining a climate condition pertaining to a vehicle based upon an external air temperature or a dew point temperature. The method also includes causing a variable displacement compressor of a heating, ventilation and air conditioning system within the vehicle to selectively transition from a variable displacement operational state to a fixed displacement-like operational state when the climate condition exceeds a climate threshold to cause an evaporator of the heating, ventilation and air conditioning system to provide evaporator air having an air temperature corresponding to a target evaporator air temperature.

In other features, the climate condition is based upon the external air temperature and the dew point temperature. In other features, the climate condition exceeds the climate threshold when the external air temperature is greater than or equal to an external temperature threshold and the dew point temperature does not exceed a dew point threshold.

In other features, the method includes incrementing a time counter when the climate condition exceeds a climate threshold and causing the variable displacement compressor to selectively transition from the fixed displacement-like operational state to the variable displacement operational state when the time counter exceeds a predefined time period.

In other features, the method includes maintaining a cyclic mode of operation flag based upon the climate condition. In other features, the cyclic mode of operation flag is set to Boolean true when the climate condition exceeds the climate threshold and is set to Boolean false when the climate condition does not exceed the climate threshold.

In other features, the method includes causing the variable displacement compressor to operate in the fixed displacement-like operational state when the cyclic mode of operation flag is set to Boolean true and the time counter does not exceed the predefined time period. In other features, the method includes causing the variable displacement compressor to transition from the fixed displacement-like operational state to the variable displacement operational state when the cyclic mode of operation flag is set to Boolean true and the time counter exceeds the predefined time period.

In other features, the method includes determining the dew point temperature based upon a cabin air humidity characteristic, an external air humidity characteristic, or an air inlet mixing radio. In other features, the method includes determining the external air temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and identical elements.

DETAILED DESCRIPTION

Air conditioning of HVAC systems of automotive vehicles operating within a hot and dry climate can result in suboptimal performance. For instance, the ductwork of the HVAC system may absorb heat due to the climate resulting in suboptimal cooling periods within a cabin of the automotive vehicle.

The HVAC system of the present disclosure selectively operates a variable displacement compressor of the HVAC system between a variable displacement operational state and a fixed displacement operational state based upon a climate condition. In one example, based upon the climate condition, the HVAC system periodically cycles the variable displacement operational state between the variable displacement operational state and the fixed displacement operational state to result in cold discharge temperatures despite heat absorption of the HVAC system.

Figure 1:
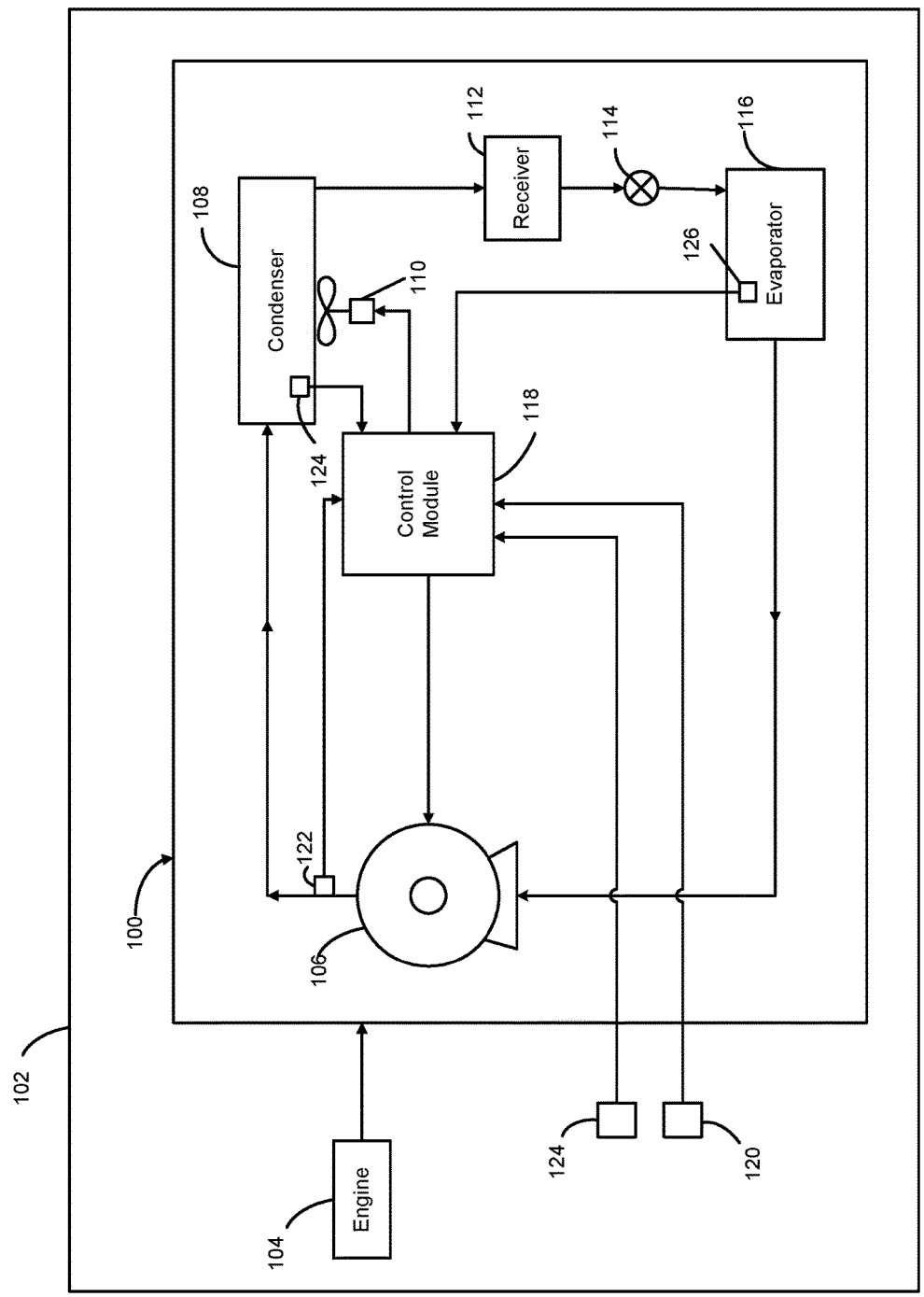
FIG. 1 is a functional block diagram of an example HVAC system used within an automotive vehicle according to the principles of the present disclosure.

FIG. 1 illustrates an example HVAC system 100 in accordance with the present disclosure employed by a vehicle 102. In one example, the vehicle 102 is a hybrid vehicle that includes an engine 104, such as an internal combustion engine, operating in conjunction with an electric motor. In another example, the vehicle 102 is a conventional vehicle that includes just the engine 104 (i.e., the internal combustion engine). The HVAC system 100 is driven by the engine 104. In one example, a clutch interfaces with the HVAC system 100 to drive the HVAC system 100.

With continuing reference to FIG. 1, a block diagram of a HVAC system 100 according to the present disclosure is shown. The HVAC system 100 includes a variable displacement compressor 106, a condenser 108 with a condenser fan 110, a receiver 112, an expansion device 114, and an evaporator 116. The HVAC system 100 also includes a control module 118 that controls power delivered to the variable displacement compressor 106 to drive the motor of the variable displacement compressor 106 at desired speeds.

The variable displacement compressor 106 receives refrigerant vapor from the evaporator 116, compresses the refrigerant vapor, and delivers high pressure refrigerant vapor to the condenser 108. The high pressure refrigerant vapor is cooled by a condenser coil of the condenser 108 and the condenser fan 110. As the high pressure refrigerant vapor is circulated through the condenser coil, heat is rejected from the refrigerant vapor and carried away from the condenser coil by the air flow generated by the condenser fan 110. The reduction in temperature causes the refrigerant vapor to condense to a liquid refrigerant state. While a condenser 108 with a single condenser fan 110 is shown, multiple condenser fans may be used. Also, the condenser fan 110 may be a fixed speed or variable speed condenser fan.

The condenser 108 delivers liquid refrigerant to a receiver 112. Refrigerant from the receiver 112 is then delivered to the expansion device 114, which reduces the pressure of the liquid refrigerant, causing the liquid refrigerant to start to transition from the liquid state to a vapor state. The low-pressure mixture of liquid and vapor refrigerant is then delivered to the evaporator 116. A fan circulates an air flow over an evaporator coil of the evaporator 116 such that heat from the air flow is absorbed by the low-pressure mixture of liquid and vapor refrigerant. The heat absorption, combined with the decrease in pressure caused by the expansion device 114, causes the refrigerant to change state back to the vapor state. The refrigerant vapor is then delivered back to the variable displacement compressor 106 and the refrigeration cycle starts anew. While FIG. 1 illustrates the HVAC system 100 as including a receiver 112, it is understood that the present disclosure may be utilized within HVAC systems that do not include a receiver (i.e., the condenser 108 delivers liquid refrigerant to the expansion device 114).

The control module 118 may receive, for example, a demand for cooling based upon a set point parameter from a user interface located within the vehicle 102. Based on the received and/or generated demand for cooling, the control module 118 may activate the variable displacement compressor 106 to operate the variable displacement compressor 106 at a determined capacity.

The vehicle 102 and/or the HVAC system 100 employs one or more sensors that measure operating condition parameters as described herein. In one example, the control module 118 receives operating condition parameters (i.e., characteristics) from one or more operating condition sensors employed by the HVAC system 100. In one example, the vehicle 102 employs sensors 120 that provide operating conditions pertaining to dew point parameters and/or air inlet mixing ratio parameters. However, it is understood that the sensors 120 can measure and provide other operating condition parameters of interest associated with the vehicle 102 to the control module 118 as described herein.

For instance, the control module 118 can receive a compressor discharge temperature representing a temperature of the refrigerant vapor exiting the variable displacement compressor 106 received from a compressor discharge temperature sensor 122. The control module 118 can also receive an ambient temperature representing an ambient temperature of air (i.e., external air temperature) received from an ambient air temperature sensor 124. The control module 118 can also receive an evaporator air temperature representing the temperature of air exiting the evaporator 116 received from an evaporator air temperature sensor 126.

Figure 2A:
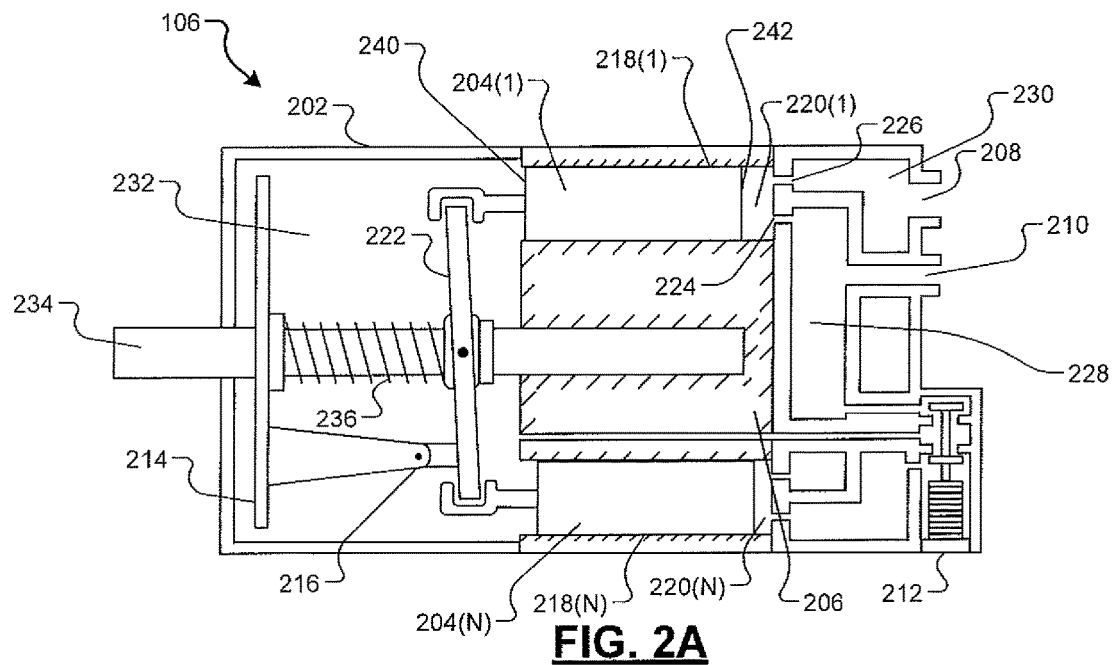
FIG. 2A is a cross-sectional illustrative diagram of a variable displacement compressor used within the HVAC system according to the principles of the present disclosure.
Figure 2B:
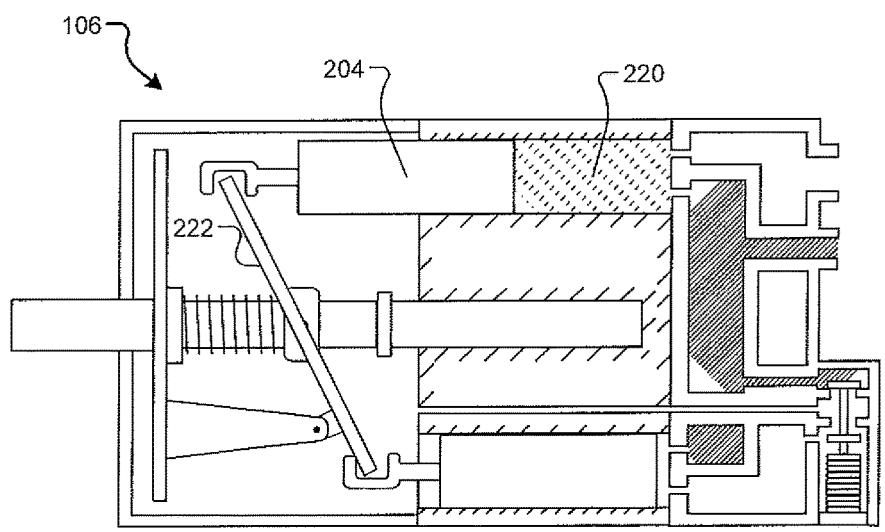
FIG. 2B is another cross-sectional illustrative diagram of the variable displacement compressor used within the HVAC system according to the principles of the present disclosure.

FIGS. 2A and 2B illustrate an example variable displacement compressor 106 in accordance with an example implementation of the present disclosure. As shown, the variable displacement compressor 106 includes a housing 202, one or more pistons 204(1) to 204(N) (where N is an integer greater than zero), a cylinder head 206, a suction port 208, a discharge port 210, a displacement control valve 212, a base plate 214, a pivot 216, one or more cylinders 218(1) to 218(N), one or more compression chambers 220(1) to 220(N) defined by respective cylinders 218(1) to 218(N), a swash plate 222, a discharge reed valve 224, a suction reed valve 226, a discharge chamber 228, a suction chamber 230, a control chamber 232, a shaft 234, and a spring 236.

As shown, the swash plate 222 is connected to the respective pistons 204(1) to 204(N) to control displacement of the pistons 204. Referring to FIG. 2A, when the variable displacement compressor 106 is not charged with refrigerant, the swash plate 222 is maintained at a first angular position that corresponds to a minimum-angle position. Referring to FIG. 2B, the swash plate 222 is displaced at a second angular position to create a displacement within the compression chamber 220 of the variable displacement compressor 106. The second angular position can correspond to a maximum-angle position. In one example, the second angular position represents the fixed displacement operational state. During respective suction strokes of the pistons 204, a volume of refrigerant is sucked into the compression chamber 220 through the suction reed valve 226 and then is pumped out into the discharge chamber 228 through the discharge reed valve 224 during respective compression strokes of the piston 204.

The pressure within the discharge chamber 228 is increased and reduces the pressure within the suction chamber 230. The refrigerant pressure within the control chamber 232 and the spring 236 positioned about the shaft 234 exert a force (F1) at a back portion 240 of respective pistons 204. As pumping continues, the force at the back of respective pistons (F1) is lesser than the force (F2) exerted on the head portion 242 of respective pistons 204 by refrigerant within the compression chambers 220. When F2 is greater that F1, the pistons 204 opposite the pivot are pushed to the left by the resultant force (i.e., F2 minus F1). The resultant force increases an angle of swash plate 222 that results in an increase in piston displacement.

Figure 3:
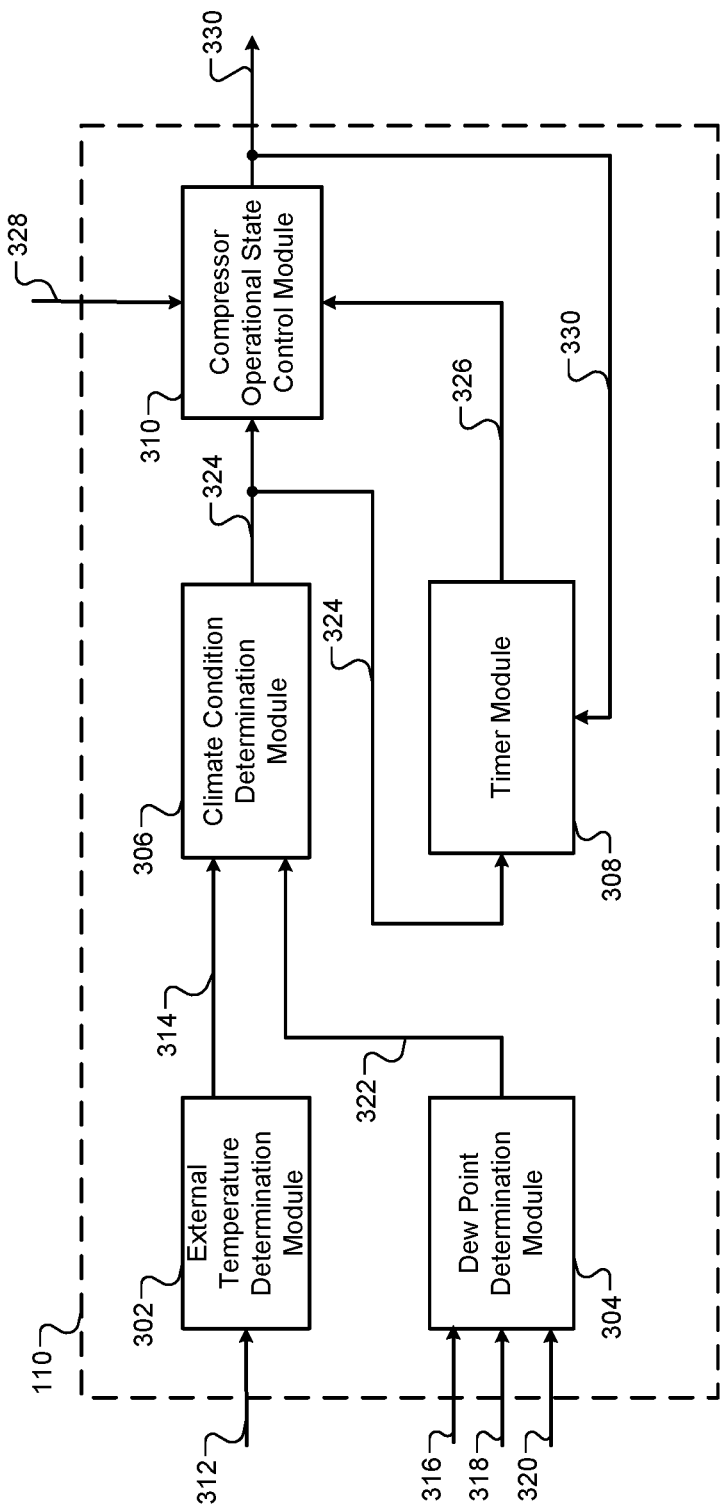
FIG. 3 is a functional block diagram of an example control module according to the principles of the present disclosure.

FIG. 3 illustrates an example control module 110, such as an engine control module or a drivetrain control module, to selectively control operational states of the variable displacement compressor 106 of the HVAC system 100. As shown, the control module 110 includes an external temperature determination module 302, a dew point determination module 304, a climate determination module 306, a timer module 308, and a compressor operational state control module 310.

The external temperature determination module 302 determines a temperature external to the vehicle 102. For instance, the external temperature determination module 302 determines an external ambient air temperature (i.e., outside air temperature). The external temperature determination module 302 receives a measured external temperature signal 312 from a sensor, such as the ambient air temperature sensor 124, that measures ambient air temperature external to the vehicle 102. The external temperature determination module 302 determines an external temperature (i.e., estimated external temperature) based upon the measured external temperature signal 312 and outputs a determined external temperature signal 314 indicative of the determined external temperature.

The dew point determination module 304 receives a cabin air humidity signal 316 indicative of a measured humidity characteristic of the cabin air within the cabin of the vehicle 102. The dew point determination module 304 also receives an external air humidity signal 318 indicative of a measured humidity characteristic of the external air. The dew point determination module 304 also receives an air inlet mixing ratio signal 320 indicative of an air inlet mixing ratio. In one example, the air inlet mixing ratio is indicative of the ratio of external air and cabin air within an inlet air mixture utilized by the HVAC system 100. The dew point determination module 304 determines the dew point air temperature associated with the evaporator 116 of the HVAC system 100 (i.e., evaporator air) utilizing the cabin air humidity signal 316, an external air humidity signal 318, and/or air inlet mixing ratio signal 320. For instance, the dew point determination module 304 utilizes a suitable model to apply to the measured cabin air humidity characteristic, the measured external air humidity characteristic, and/or the air inlet mixing ratio to determine dew point temperature of the evaporator air (i.e., evaporator inlet air). The dew point determination module 304 generates a determined dew point temperature signal 322 indicative of the determined dew point temperature of the evaporator air.

The climate determination module 306 receives the determined external temperature signal 314 and the determined dew point temperature signal 322 as input and determines a climate condition based upon the dew point temperature and the external temperature. For instance, the climate determination module 306 determines external climate conditions based upon the external temperature and/or the dew point temperature of the evaporator air.

In one example, the climate determination module 306 stores an external temperature threshold and/or a dew point temperature threshold. In this example, the climate determination module 306 compares the external temperature with the external temperature threshold and/or compares the dew point temperature with the dew point threshold. A positive dew point temperature indicates a risk or chance of the evaporator freeze due to operating the compressor with a reduced target evaporator outlet air temperature that is below or at the freezing point (0° C.).

Based upon the comparison, the climate determination module 306 generates a climate signal 324 indicating a suitable climate condition to selectively operate the variable displacement compressor 106 between a normal mode with a positive target evaporator outlet air temperature and a cyclic mode. In the cyclic mode of operation, the target value of the evaporator outlet air temperature is periodically cycled between a positive or maximum value such as that used in the normal mode of operation and a negative or a reduced to overcome heat pick-up by the HVAC module and achieve cold discharge air temperature. For instance, the climate determination module 306 generates a climate signal 324 indicating a climate condition exceeds a climate threshold when external temperature exceeds the external temperature threshold and the dew point temperature is below the dew point temperature threshold. These two climate conditions may indicate a hot and dry external climate.

The climate signal 324 can be indicative that the external temperature exceeds the external temperature threshold and that a cyclic mode of operation (or fixed displacement-like operation) flag is true. For instance, as described herein, the compressor operational state control module 310 causes the variable displacement compressor 106 to operate in a cyclic, fixed displacement-like operational state when the external temperature exceeds the external temperature threshold and a cyclic mode of operation flag is true. In one example, the operational state control module 310 retains a Boolean operator indicative of whether the cyclic mode of operation flag is true or false. In one example, the external temperature threshold may be forty degrees Celsius (40° C.). In this example, a determination is made of whether the external temperature is greater than or equal to the external temperature threshold. However, the compressor operational state control module 310 allows the variable displacement compressor 106 to operate in a variable displacement operational state (a normal mode of operation) when a cyclic mode of operation flag is false. The cyclic mode of operation flag may be false because the dew point temperature is equal or greater than the dew point temperature threshold and/or the external temperature does not exceed the external temperature threshold.

The timer module 308 receives the climate signal 324 as input and generates a timer signal 326. In an implementation, the timer module 308 initiates a time counter to measure a first evaporator air temperature time period indicative of the variable displacement compressor 106 operating in the cyclic mode of operation upon receiving the climate signal 324 to initiate operation in the cyclic mode. Once the time counter exceeds the first evaporator air temperature time period, the timer module 308 generates the timer signal 326, which is provided to the compressor operational state control module 310. In some instances, if the variable displacement compressor 106 operates in the reduced target evaporator outlet air temperature for a time period exceeding the predefined time period, the potential for the evaporator 116 to freeze increases.

While in cyclic mode of operation, upon expiration of the first evaporator air temperature time period, the timer module 308 initiates a time counter to measure a second evaporator air temperature time period indicative of the variable displacement compressor 106 operating with the normal positive target evaporator outlet air temperature. Once the time counter exceeds the second evaporator air temperature time period, the timer module 308 generates the timer signal 326, which is then provided to the compressor operational state control module 310.

In addition to receiving the climate signal 324 and the timer signal 326, the compressor operational state control module 310 also receives an evaporator air temperature signal 328. The evaporator air temperature signal 328 is indicative of the evaporator air temperature measured by the evaporator air temperature sensor 126. The compressor operational state control module 310 generates an operational state control signal 330 to selectively control an operational state (i.e., mode of operation) of the variable displacement compressor 106. The compressor operational state control module 310 generates the operational state control signal 330 when the climate signal 324 is received indicating that the external temperature exceeds the external temperature threshold and the dew point temperature is below the dew point temperature threshold.

In one example, the compressor operational state control module 310 selectively controls the variable displacement compressor 106 between a variable displacement operational state (a normal mode of operation of the variable displacement compressors) and a fixed displacement-like operational state with a cycling target evaporator outlet air temperature between a normal positive value or a maximum value and a reduced negative or zero value or a minimum value. In some examples, as described herein, the compressor operational state control module 310 causes the variable displacement compressor to operate in the variable displacement operational state. The variable displacement operational state represents a state of operation in which the displacement of the pistons 204 varies based upon varying displacement of the swash plate 222.

The fixed displacement operational state represents a state of operation in which the displacement of the pistons 204 is fixed based upon the swash plate maintaining a fixed orientation, such as shown in FIG. 2B. In one example, when the variable displacement compressor 106 is operated in the fixed displacement-like operational state, the angle of swash plate 222 is maintained at the maximum angle position resulting in maximum piston 204 displacement. Operating the variable displacement compressor 106 in a fixed displacement-like operational state for a predefined period of time allows the evaporator air temperature ("EAT") to drop into a sub-zero region while mitigating potential evaporator 116 freeze. Upon receiving the time signal 326 indicating that the predetermined time period has elapsed, the compressor operational state control module 310 generates the operational state control signal 330 to cause the variable displacement compressor 106 to transition from a fixed displacement operational state to a variable displacement operational state.

In some examples, the compressor operational state control module 310 sets a maximum evaporator air temperature target and a minimum evaporator air temperature target based upon environmental conditions, and the like. The compressor operational state control module 310 monitors the maximum evaporator air temperature target and the minimum evaporator air temperature target by comparing the respective target with the evaporator air temperature signal 328. In one example, the compressor operational state control module 310 sets a target evaporator air temperature that cycles between a nominal value corresponding to the variable displacement operational state and a subzero value corresponding to the fixed displacement-like operational state. As described herein, the HVAC system periodically cycles the target evaporator air temperature such based upon the climate conditions to cause the variable displacement compressor to selectively transition from the variable displacement operational state to the fixed displacement-like operational state.

Figure 4:
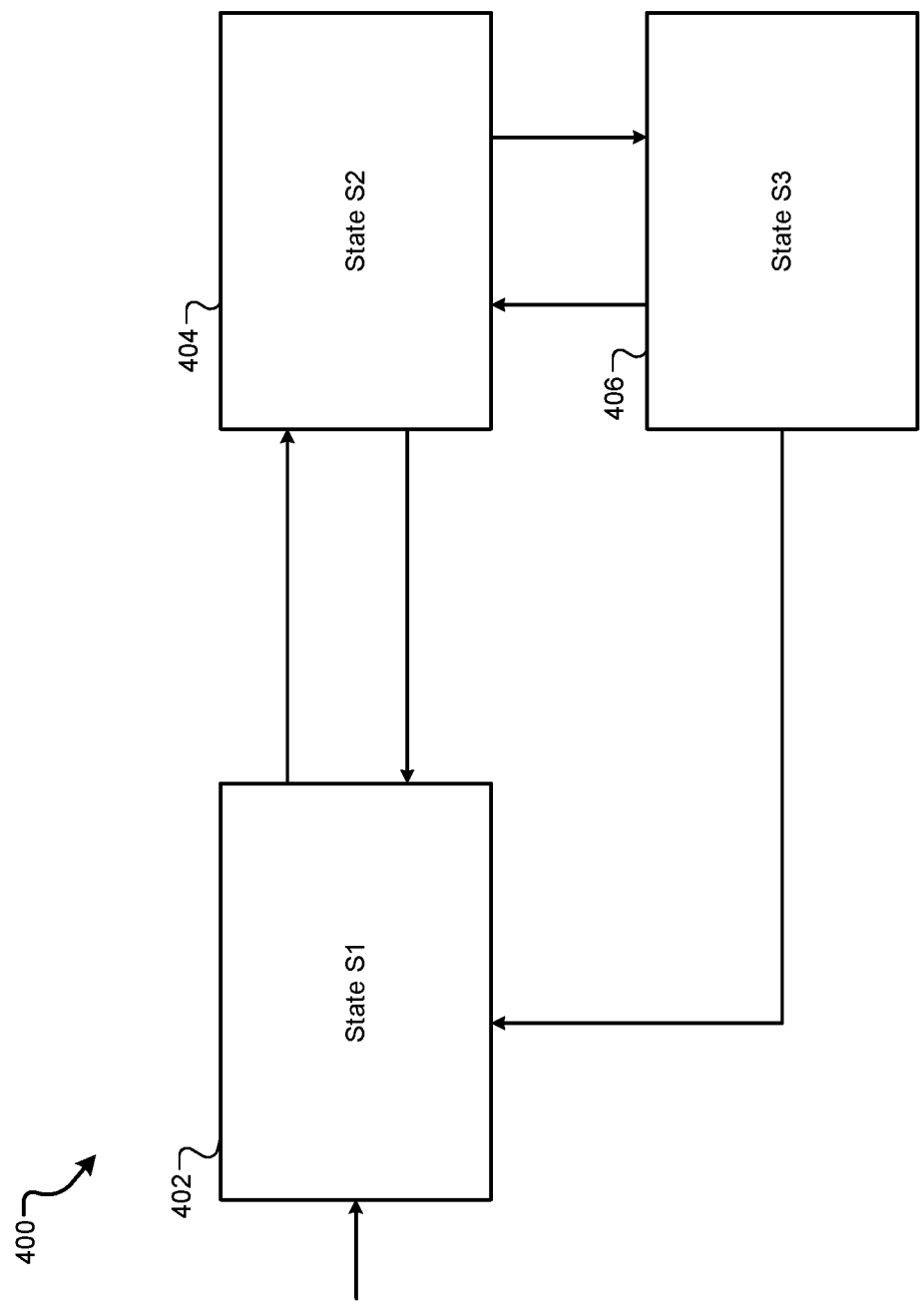
FIG. 4 is a state diagram illustrating various states for selectively operating the variable displacement compressor based upon a climate condition according to the principles of the present disclosure.

FIG. 4 illustrates an example state diagram 400 for selectively controlling an operational state of a variable displacement compressor 106. At state 402 (state S1), the compressor operational state control module 310 determines whether the cyclic mode of operation flag is true. If the fixed displacement-like operational state is true (i.e., the external temperature exceeds or is equal to the external temperature threshold and/or the dew point temperature of the evaporator inlet air is below the dew point temperature threshold, that is typically a minimum evaporator air temperature target), the compressor operational state control module 310 determines whether the difference between a maximum evaporator air temperature target ("MAX_EAT") and a minimum evaporator air temperature target ("MIN_EAT") is less than a maximum evaporator air temperature threshold ("MAX_THRESHOLD"), which can be represented as:

$$(\text{MAX\_EAT} - \text{MIN\_EAT}) \leq \text{MAX\_THRESHOLD} \qquad (1)$$

If the compressor operational state control module 310 determines that the difference between the maximum evaporator air temperature target ("MAX_EAT") and the minimum evaporator air temperature target ("MIN_EAT") is less than the maximum evaporator air temperature threshold ("MAX_THRESHOLD"), the state diagram 400 transitions from state 402 to state 404. At state 404 (state S2), the compressor operational state control module 310 sets (i.e., calibrates) the target evaporator air temperature parameter to a first evaporator air target temperature parameter. For instance, the first evaporator air target temperature parameter is a subzero temperature target such that the air emitted by the evaporator 116 is at or near (i.e., within two degrees Celsius, within five degrees Celsius, etc.) a subzero target evaporator air temperature. The minimum target temperature is a function of a desired evaporator air temperature and the dew point temperature to mitigate freezing of the evaporator 116.

The state diagram 400 may transition from state 404 to state 402 when the cyclic mode of operation flag is false. Additionally, if the compressor operational state control module 310 determines that the difference between the maximum evaporator air temperature target and the minimum evaporator air temperature target is greater than or equal to the maximum evaporator air temperature threshold, the state diagram 400 transitions from state 404 to state 402.

The state diagram 400 transitions from state 404 to state 406 when the compressor operational state control module 310 receives the timer signal 326 indicating that the time counter corresponding to the first evaporator air temperature time period has elapsed. At state 406 (state S3), the compressor operational state control module 310 sets the target evaporator air temperature parameter to a second evaporator air target temperature parameter. In one example, the second evaporator air target temperature parameter is a positive (i.e., non-subzero target) evaporator air temperature target.

By cycling the evaporator outlet air target temperature between a minimum value and a maximum value, the compressor operational state control module 310 causes the variable displacement compressor 106 to transition from a variable displacement operational state to the fixed displacement like operational state.

The state diagram 400 transitions from blocks 406 and 404 to block 402 when the external temperature does not exceed the external temperature threshold and/or the dew point temperature of the evaporator inlet air exceeds or is equal to the dew point temperature threshold. In one example, a determination is made of whether the external temperature is less than the external temperature threshold. The state diagram 400 transitions from block 406 to block 404 when the compressor operational state control module 310 receives a timer signal 326 indicating that a time counter corresponding to the second evaporator air temperature time period has elapsed. Thus, the state diagram 400 remains in either state 404 or state 406 when the external temperature exceeds or is equal to the external temperature threshold and/or the dew point temperature of the evaporator inlet air is below the dew point temperature threshold. Additionally, the logic set forth in the state diagram 400 allows the compressor operational state control module 310 to periodically cycle emission of the evaporator air having an air temperature at or near the target evaporator air temperature.

Figure 5:
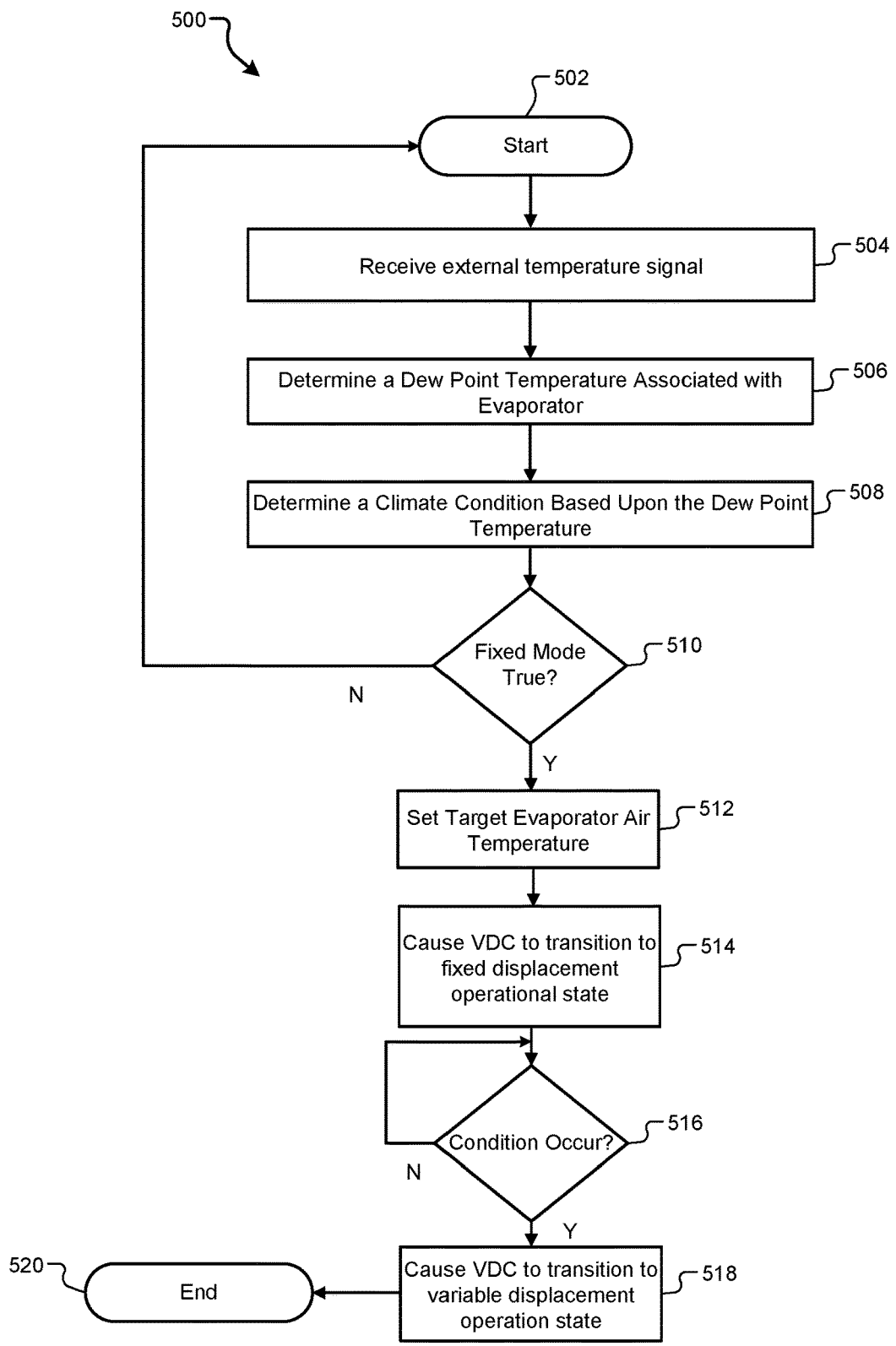
FIG. 5 is a flowchart illustrating an example method for selectively operating a variable displacement compressor based upon a climate condition according to the principles of the present disclosure.

FIG. 5 illustrates an example method 500 for selectively operating a variable displacement compressor 106 of a vehicle 102 between a variable displacement operational state and a fixed displacement-like operational state. The method starts at 502. At 504, the external temperature determination module 302 receives a measured external temperature signal 312 from a sensor 124 indicative of an external temperature. At 506, the dew point determination module 304 determines the dew point air temperature associated with the evaporator 116. As described above, the dew point determination module 304 determines the dew point temperature based upon the cabin air humidity signal 316, the external air humidity signal 318, and the air inlet mixing ratio signal 320.

At 508, the climate determination module 306 determines the climate condition based upon the determined dew point temperature of the evaporator air and the determined external temperature. For example, the climate determination module 306 generates a climate signal 324 indicative of whether the cyclic mode of operation flag is true. The fixed displacement flag is true when the climate determination module 306 determines that a suitable climate condition exists to operate the variable displacement compressor 106 in fixed displacement-like operational state.

At 510, the compressor operational state control module 310 determines whether the cyclic mode of operation flag is true. If the cyclic mode of operation flag is false, the method 500 transitions to 502. If the fixed displacement-like operational state is true, the compressor operational state control module 310 sets the target evaporator air temperature parameter to a first evaporator air target temperature parameter at 512. At 514, the compressor operational state control module 310 generates the operational state control signal 330 causing the variable displacement compressor (VDC) 106 to transition from the variable displacement operational state to the fixed displacement-like operational state. Additionally, the timer module 308 initiates the time counter for determining whether an elapsed time, as measured by the time counter, exceeds the first evaporator air temperature time period.

At 516, the compressor operational state control module 310 determines whether a condition has been occurred to cause the variable displacement compressor 106 to transition from the fixed displacement-like operational state to the variable displacement operational state. In one example, the compressor operational state control module 310 determines whether cyclic mode of operation flag has transitioned from true to false. For instance, the cyclic mode of operation flag may transition from true to false when either the external air temperature is less than the external air temperature threshold or the dew point air temperature exceeds or is equal to the dew point temperature threshold. In another example, the compressor operational state control module 310 determines whether the elapsed time exceeds the first evaporator air temperature time period.

If the condition is not met, the method 500 transitions to 516 to continue monitoring whether a condition has occurred to cause the cyclic mode of operation flag has transitioned from true to false. If a condition has occurred, the compressor operational state control module 310 causes the variable displacement compressor 106 to transition from a fixed displacement-like operational state to a variable displacement operational state at 518. The method 500 ends at 520.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and microcode, and may refer to programs, routines, functions, classes, data structures, and objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a climate condition determination module that is configured to determine a climate condition associated with a vehicle based upon at least one of an external air temperature and a dew point temperature; and
   a compressor operational state control module that is configured to control a plurality of operational states of a variable displacement compressor of a heating, ventilation and air conditioning system within the vehicle, the compressor operational state control module configured to:
      cause the variable displacement compressor to selectively transition from a variable displacement operational state to a fixed displacement-like operational state when the climate condition exceeds a climate threshold, wherein an evaporator of the heating, ventilation and air conditioning system provides evaporator air having an air temperature corresponding to a target evaporator air temperature when the variable displacement compressor is in the fixed displacement-like operational state,
      wherein the climate condition is based upon the external air temperature and the dew point temperature,
      wherein the climate condition exceeds the climate threshold when the external air temperature is greater than or equal to an external temperature threshold and the dew point temperature does not exceed a dew point threshold.

2. The system as recited in claim 1 further comprising a timer module that is configured to increment a time counter when the climate condition exceeds a climate threshold, wherein the compressor operational state control module is further configured to selectively transition between a minimum and a maximum evaporator air target temperatures to produce a fixed displacement-like operation with the variable displacement compressor.

3. The system as recited in claim 2 wherein the compressor operational state control module is further configured to maintain a cyclic mode of operation flag based upon the climate condition.

4. The system as recited in claim 3 wherein the cyclic mode of operation flag is set to Boolean true when the climate condition exceeds the climate threshold and is set to Boolean false when the climate condition does not exceed the climate threshold.

5. The system as recited in claim 4 wherein the compressor operational state control module is further configured to cause the variable displacement compressor to operate in the fixed displacement-like operational state when the cyclic mode of operation flag is set to Boolean true and the time counter does not exceed a predefined time period.

6. The system as recited in claim 4 wherein the compressor operational state control module is further configured to cause the variable displacement compressor to transition from the fixed displacement-like operational state to the variable displacement operational state when the cyclic mode of operation flag is set to Boolean true and the time counter exceeds a predefined time period.

7. The system as recited in claim 1 further comprising a dew point determination module that is configured to determine the dew point temperature based upon at least one of a cabin air humidity characteristic, an external air humidity characteristic, and an air inlet mixing radio.

8. The system as recited in claim 1 further comprising an external temperature determination module that is configured to determine the external air temperature.

9. A method comprising:
   determining a climate condition pertaining to a vehicle based upon at least one of an external air temperature and a dew point temperature; and
   causing a variable displacement compressor of a heating, ventilation and air conditioning system within the vehicle to selectively transition from a variable displacement operational state to a fixed displacement-like operational state when the climate condition exceeds a climate threshold, wherein an evaporator of the heating, ventilation and air conditioning system provides evaporator air having an air temperature corresponding to a target evaporator air temperature when the variable displacement compressor is in the fixed displacement-like operational state,
   wherein the climate condition is based upon the external air temperature and the dew point temperature,
   wherein the climate condition exceeds the climate threshold when the external air temperature is greater than or equal to an external temperature threshold and the dew point temperature does not exceed a dew point threshold.

10. The method as recited in claim 9 further comprising incrementing a time counter when the climate condition exceeds a climate threshold; and causing the variable displacement compressor to selectively transition from the fixed displacement-like operational state to the variable displacement operational state when the time counter exceeds a predefined time period.

11. The method as recited in claim 10 further comprising maintaining a cyclic mode of operation flag based upon the climate condition.

12. The method as recited in claim 11 wherein the cyclic mode of operation flag is set to Boolean true when the climate condition exceeds the climate threshold and is set to Boolean false when the climate condition does not exceed the climate threshold.

13. The method as recited in claim 12 further comprising causing the variable displacement compressor to operate in the fixed displacement-like operational state when the cyclic mode of operation flag is set to Boolean true and the time counter does not exceed the predefined time period.

14. The method as recited in claim 12 further comprising causing the variable displacement compressor to transition from the fixed displacement-like operational state to the variable displacement operational state when the cyclic mode of operation flag is set to Boolean true and the time counter exceeds the predefined time period.

15. The method as recited in claim 9 further comprising determining the dew point temperature based upon at least one of a cabin air humidity characteristic, an external air humidity characteristic, and an air inlet mixing radio.

16. The method as recited in claim 9 further comprising determining the external air temperature.

* * * * *